United States Patent [19]

Johnson et al.

[11] 4,124,784
[45] Nov. 7, 1978

[54] MOTION PICTURE SOUND SYSTEM

[75] Inventors: Keith O. Johnson, Tarzana, Calif.; David E. Blackmer, Wilton, N.H.; John deS. Mosely, Beverly Hills, Calif.

[73] Assignee: DBX, Inc., Newton, Mass.

[21] Appl. No.: 799,573

[22] Filed: May 23, 1977

[51] Int. Cl.² .......................... G11B 7/00; G03B 31/02
[52] U.S. Cl. ................................. 179/100.3 R; 352/27
[58] Field of Search ................ 179/100.3 R, 100.3 E, 179/100.3 B, 100.3 GN; 352/1, 25, 26, 27; 235/61.6 A

[56] References Cited

U.S. PATENT DOCUMENTS

| 2,487,511 | 11/1949 | Bedford | 179/100.3 R |
| 3,964,826 | 6/1976 | Joseph et al. | 179/100.3 E |
| 4,044,207 | 8/1977 | Vlahos | 179/100.3 R |

Primary Examiner—Daryl W. Cook
Attorney, Agent, or Firm—Schiller & Pandiscio

[57] ABSTRACT

A system for detecting and reproducing variable-area-type optically recorded audio signals by cyclically detecting substantially only the position of a boundary of the sound track. In one embodiment, the boundary is detected by imaging the boundary onto an array of photosensors and scanning the array to provide an output signal containing a transition corresponding in the time domain to the position of the boundary. The transition signal is filtered and sliced to provide electrical interpolation to improve the resolution substantially over the special resolution of the photosensitive elements of the array. The system may also include a multi-track capability with means for minimizing the effect of film weave.

17 Claims, 7 Drawing Figures

MOTION PICTURE SOUND SYSTEM

This application relates to optically recorded sound signals, and more particularly to a novel system for detecting and reproducing optically recorded audio signals.

The preferred technique of recording sound signals optically, as in motion picture film, is the well-known variable-area recording system. In a positive print of a sound track produced by the latter system, the width of the transparent area represents the audio signal, and is usually produced by a modulatator which varies the relative width of a beam of light with respect to a slit.

In reproducing the sound from a variable-area recorded track, there are substantial noise problems. The audio signal is usually reproduced by focusing an image of a slit onto the sound track, the total light flux then seen by a detector located on the opposite side of the sound track being proportional to the width of the transparent portion of the track at the slit image. However, light occluded by portions of the transparent area and light transmitted by the dark area will create undesirable background signals or noise. Dirt, scratches, dark spots, and striations in the transparent area may actually transiently attenuate the total light transmission by as much as 50%, and light transmitted by imperfections in the emulsion or silver layer forming the boundary of the track may permit extraneous light to create undesired modulation and thus additional noise.

A principal object of the present invention is to provide a novel system for detecting or reading the audio information from a variable-area type sound track, in which system the noise is considerably reduced. Another important object of the present invention is to permit greater information density to be recorded on and reproduced from an optically recorded sound track than has hitherto been feasible. The novel system of the present invention is based upon the realization that adequate audio information is carried simply by the positional variations of a boundary between the transparent and opaque areas of the variable-area recorded sound track. Because the system of the present invention serves to detect or sense the position of the transparent/opaque boundary, without requiring the use of any information from the remainder of the sound track, the resulting signal necessarily must have considerably less comparative noise content, since statistically only a very few of the noise-producing anomalies will be found at or immediately adjacent such boundary.

The present invention therefore generally comprises means for sensing the position of a boundary between opaque and transparent portions of a recorded sound track and for producing an electrical signal transition in the time domain, the phase of which is a function of the sensed position of the boundary. Means are also provided for converting the phase of that electrical signal into a corresponding amplitude and the latter into sound. In a preferred embodiment, in order to sense the position of the boundary there is included an array of discrete photoelectric sensor elements positionable such that an image such as a shadow of the boundary extends transversely of the array, means for scanning the array so as to produce a train of electrical pulses each having an amplitude (where the originating sensor element is on one side of the boundary) which differs sharply from the amplitudes provided from sensor elements on the other side of the boundary. Filter means are included for providing the envelope of the train of pulses. In a preferred version of the invention, means are provided for wave-shaping the signal to permit unexpected sensitivity of the system to changes in the boundary position.

Other objects of the invention will in part be obvious and will in part appear hereinafter. The invention accordingly comprises the apparatus possessing the construction, combination of elements and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein.

Figure 1:
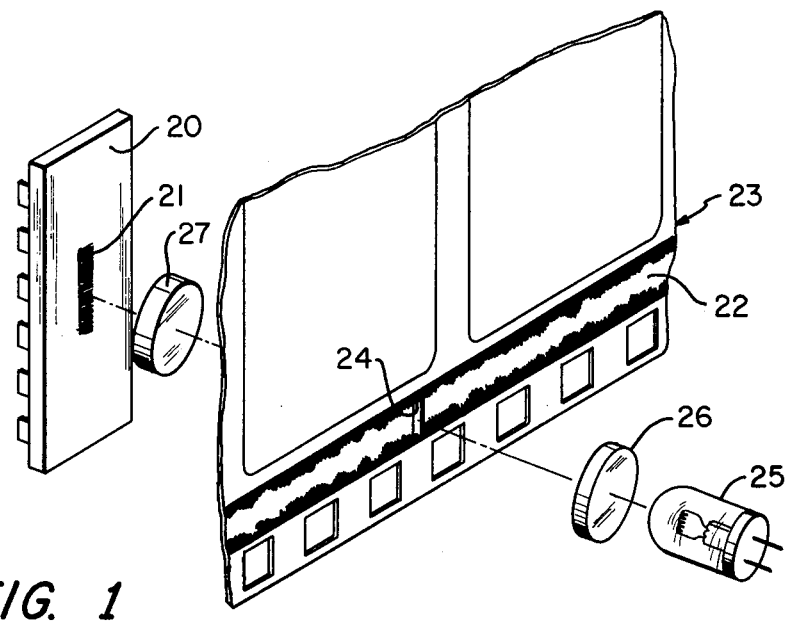
FIG. 1 is a schematic perspective representation of the optical portion of a device embodying the principles of the present invention.
Figure 3:
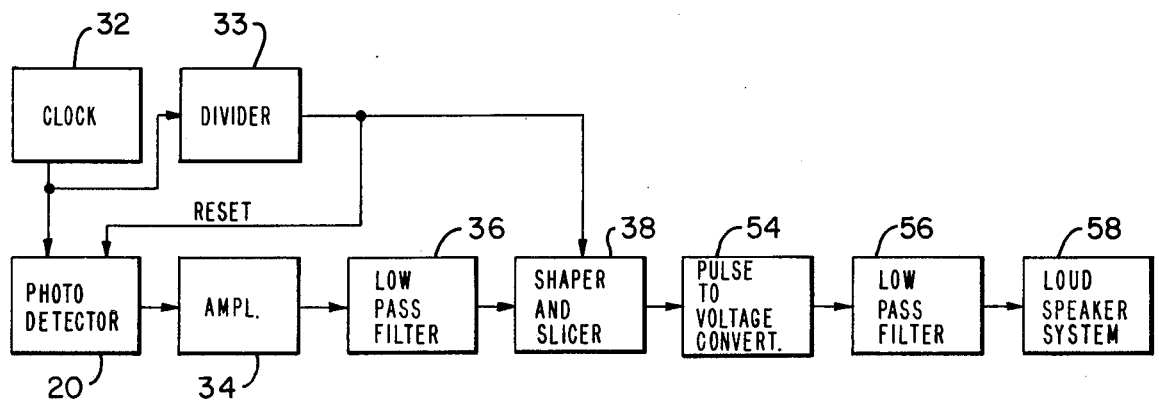
FIG. 3 is a block diagram of a circuit showing a typical implementation of the electrical portion of an embodiment of the present invention, particularly for a monophonic or single sound track recording.
Figure 5:
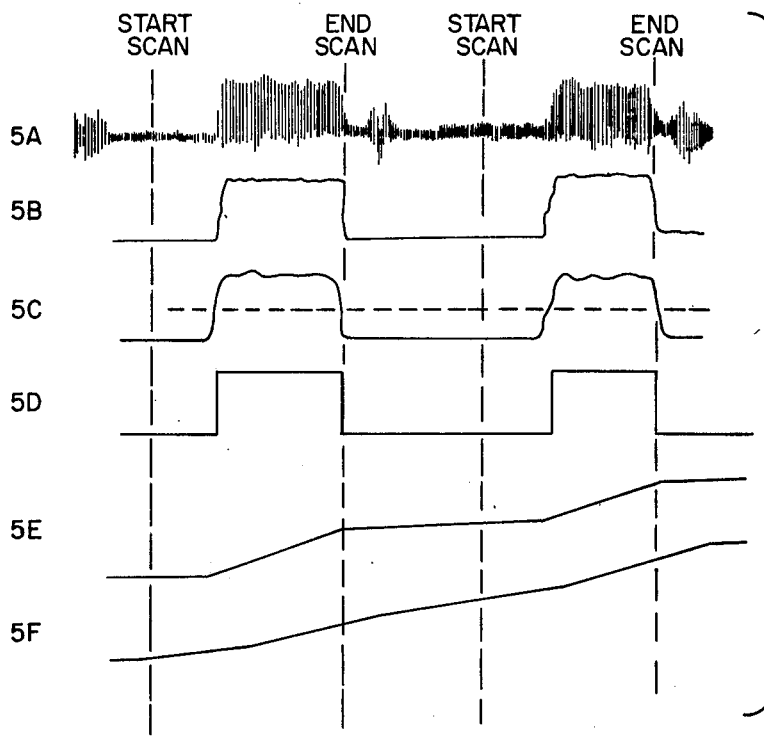
Figure 6:
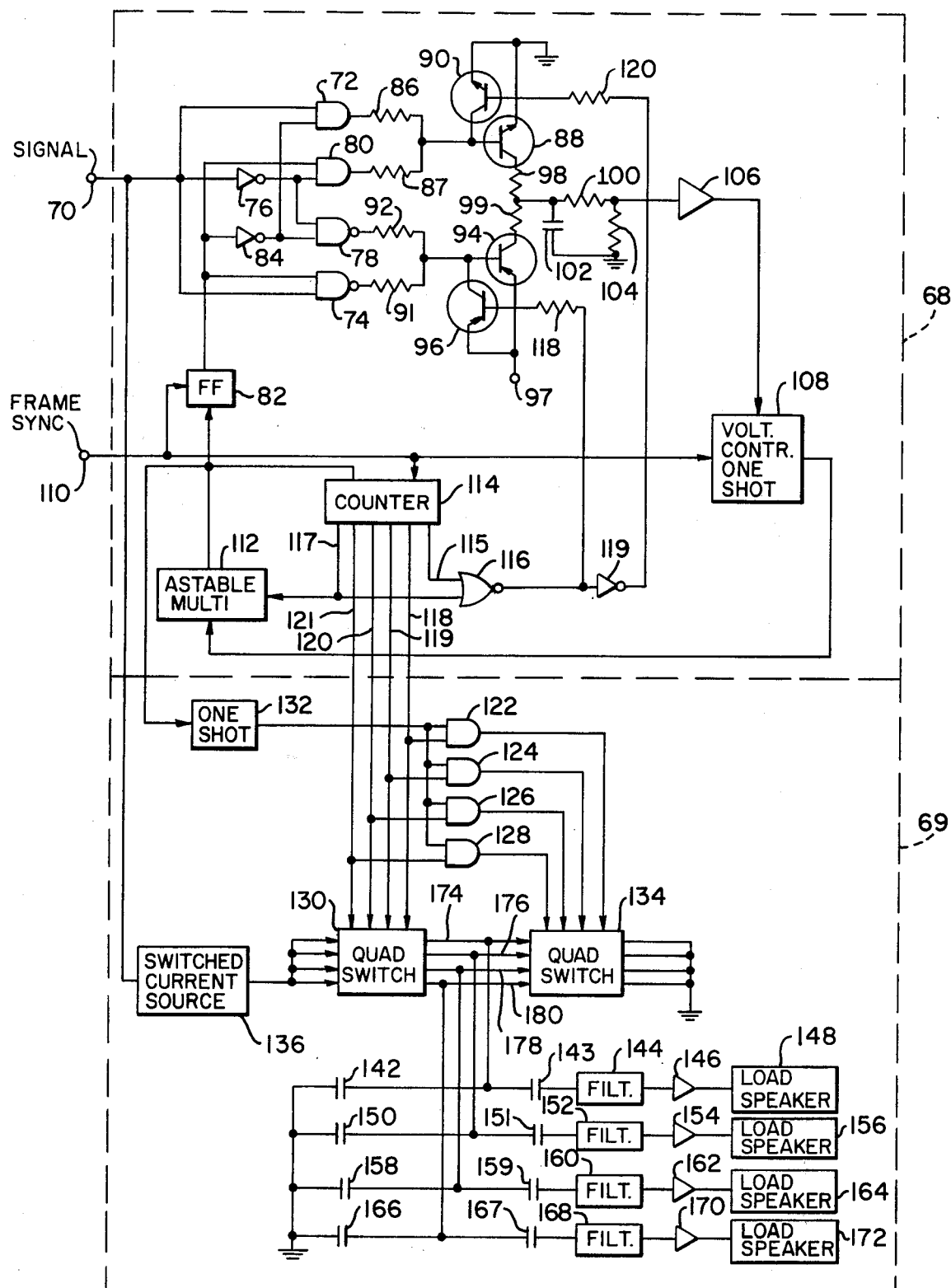

FIG. 5, including 5A through 5F, is a group of various exemplary waveforms illustrating the operation of the device of FIGS. 1 and 3; and FIG. 6 is a circuit schematic, partly in block form, showing another implementation of the electrical portion of a four channel embodiment of the present invention.

Figure 4:
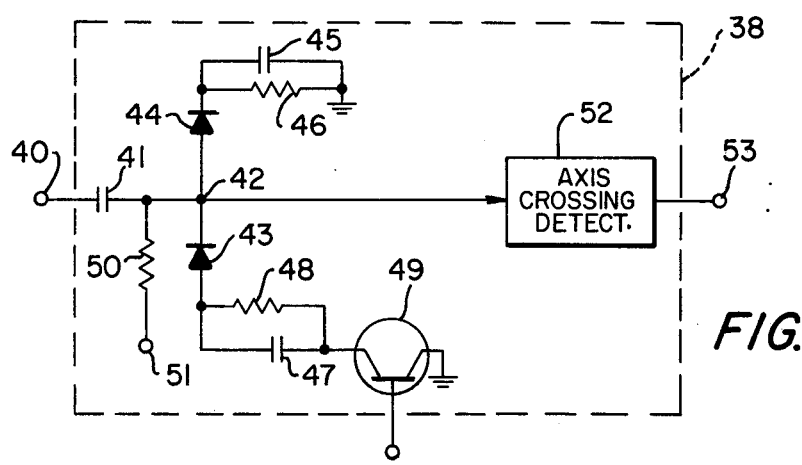
FIG. 4 is a circuit schematic, partly in block form, of a portion of the embodiment of FIG. 3.
Figure 7:
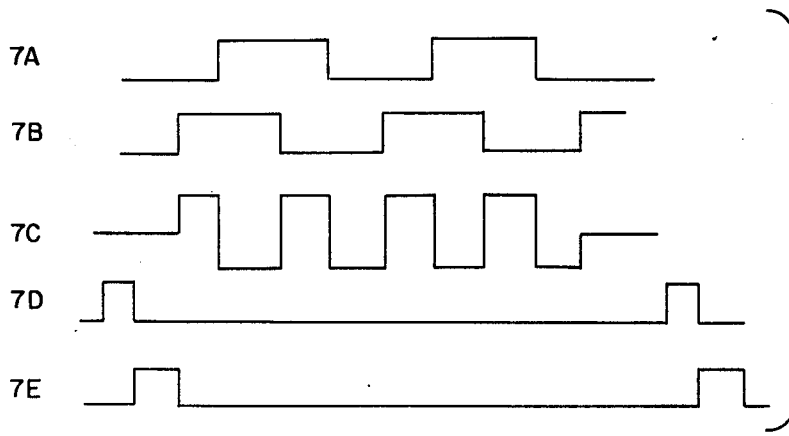

FIG. 7 is a group of various waveforms illustrating the operation of FIGS. 3, 4, and 6.

Figure 2:
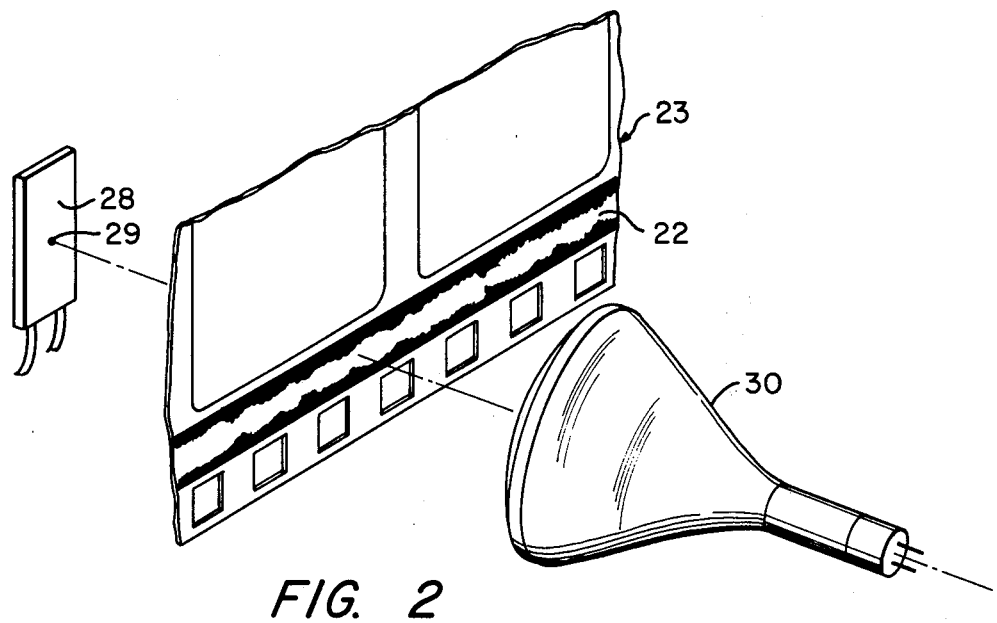
FIG. 2 is a schematic representation of yet another optics system for detecting sound track boundaries according to the principles of the present invention.

Referring particularly to FIGS. 1 and 2, the principles of the present invention are exemplified by a system which photoelectrically detects the position of at least one boundary of a variable-area type of recorded sound track, and converts the boundary position into corresponding audio signals. To this end, particularly as shown in FIG. 1, the system of the present invention includes photoelectric detector 20 having an array 21, preferably linear, of a plurality of photosensors. Array 21 is intended to be disposed transversely of the direction of motion of sound track 22 on motion picture film strip 23. As well known from the prior art, means are provided for illuminating the sound track transversely by a band or strip 24 of light, and to this end a simple system includes light source 25 and aspheric lens 26. Photoelectric device 20 is positioned so that array 21, in the absence of film strip 23, is coincident with light strip 24, thereby insuring that as sound track 22 is moved longitudinally with strip 23 between detector 20 and lens 26, a boundary between the transparent and opaque portions (or different colors, etc.) of track 24 will be imaged (which term includes shadowing and the like) typically by objective lens 27 onto array 21 and thus lateral changes in the boundary relative to the direction of motion of track 22 will provide corresponding variations in the position of the image of the boundary along array 21.

As photoelectric device 20, one can advantageously use a linear imaging device such as the monolithic self-scanned integrated circuit commercially available and described under the title *CCD 110/110F 256 Element Linear Image Sensor* in a brochure published by Fairchild Semiconductor Components Division, Fairchild Camera and Instruments Corp. Mountain View, Calif., January 1976. This device (hereinafter referred to as a CCD) includes a linear array of 256 image sensor elements separated by diffused channel stops and covered by a silicon photogate. The device also includes two transfer gates adjacent opposite sides of the array of image sensor element. When clocked, one of the transfer gates transfers the charges from the odd numbered image sensor elements in sequence to a corresponding analog shift register, the other of the transfer gates transferring the charges from the even numbered sensor elements in sequence to a second analog shift register. The charges stored in the two registers can be shifted out of the device through a preamplifier in proper phase relation, thereby producing a train of electrical pulses, the amplitude of each and its position in the sequence corresponding respectively to the integrated light intensity incident on respective ones of the sensors in the array and the respective positions of the sensors. The time (i.e. phase) relation of the pulses in the pulse train output therefore corresponds to samplings of light intensity distribution from one end to the other of the linear array.

The present invention should not be considered to be limited to the particular form of detector 20 shown in FIG. 1. Alternatively, for example, one can employ a flying spot type of scanning mechanism such as shown in FIG. 2 wherein a single elongated photoelectric sensor 28 is exposed to a spot of light moving from one end of sensor 28 to the other end, the dwell time of the spot 29 on sensor 28 being controlled by the positions of a boundary of track 22. Spot 29 typically can be produced by any of a number of known mechanisms such as a light source and a rotating, multi-faceted mirror, or, as shown in FIG. 2, cathode ray tube 30 employing a high intensity spot produced in known manner by the motion of an electron beam across a short-persistence phosphor screen. The leading (or trailing) edge of the signal from sensor 28 is then a function, in the time domain, of the location of the boundary as spot 29 traverses the latter.

Thus as shown in FIG. 3, the system of the invention also includes clocking means shown generally at 32. When detector 20 is a CCD 110/110F, the output of clock 32 is coupled to photoelectric device 20 to control the scanning by the transfer gates and the shift rate through the analog shift registers, both according to the specifications set forth in the aforementioned CCD 110/110F brochure.

The output of clock 32 (or a separate clock) is to be divided down in frequency divider 33 to produce an output or reset pulse at a fixed time relative to each scan cycle. The reset pulse when applied to a reset transistor gate in the CCD 110/110F resets the entire system so that the next sampling scan can commence. If device 20 is a single sensor and flying spot, clock 32 provides the necessary time base.

The output of the photoelectric device 20 is coupled to the input of amplifier 34, the latter preferably being a differential amplifier so that it can accept both the outputs of the preamplifier and a compensation amplifier when device 20 is a linear image sensor such as the CCD 110/110F, and thus eliminate substantial noise produced by the latter internally. The output of amplifier 34 in turn is coupled to the input of low pass filter 36. Preferably, the latter is a 7-pole filter which typically has an upper frequency pass limit of about 1 to 2 MHz (i.e. well below the typical sampling rate of 12 MHz at which the elements of array 21 are scanned) and essentially serves to average the output pulse train from device 20 so as to produce the pulse train envelope containing the signal transition corresponding on a time base to the positional location in the array of the photosensors of a boundary between transparent and opaque portions of sound track 22 at some predetermined moment.

The output signal from filter 36 is preferably processed or shaped in order to remove any distortions introduced by the electronic circuitry and also to greatly improve resolution of boundary position. For example, it is known that the CCD 110F exhibits a phenomenon similar to "blooming" on cathode ray tubes, in that the base signal level tends to vary considerably depending upon the total light flux to which the sensors are exposed. Consequently, in the preferred form of the invention, the output of low pass filter 36 is connected to the input of wave shaping circuit 38. In the embodiment of the invention employing a CCD 110/110F as device 20, circuit 38 is preferably a bilateral, DC restoring circuit centered around a predetermined signal level, and includes a sense amplifier or axis-crossing detector coupled to the output of level restoring portion of circuit 38.

A form of wave-shaping circuit 38 is shown in detail in FIG. 4 and includes an input terminal 40 which is connected to the output of filter 36. An input coupling capacitor 41 is connected between terminal 40 and junction 42. Junction 42 is coupled to the cathode of diode 43 and the anode of diode 44. An RC tank comprising capacitor 45 and resistor 46 is connected in parallel between the cathode of diode 44 and ground. Similarly another RC network comprising paralleled capacitor 47 and resistor 48 is connected between the anode of diode 43 and ground through a switch formed, for example, by field-effect-transistor 49. Junction 42 is also connected to a biasing source formed of resistor 50 and terminal 51 at which a predetermined DC potential is intended to be applied. Lastly, terminal 42 is connected to the input of axis-crossing detector 52, output terminal 53 of which is intended to be coupled to the input of a pulse-width-to-voltage converter 54. The output of pulse width voltage converter 54 in turn is connected to low pass filter 56. The output of the latter is intended to be applied for example to the driving amplifier of loudspeaker system 58 to convert the electrical signals to sound.

In operation, filmstrip 23 is passed through the optical reading head at a speed determined by the frame rate at which the optical portion of the filmstrip is to be exhibited. As film strip 23 moves longitudinally, changes in the position of an edge of sound track 22 will be imaged as corresponding changes in illumination on photosensitive array 21, the magnitude of a change of position of the boundary image along the array corresponding to the number of sensor elements illuminated, the time rate of change in the number of illuminated sensor elements being a function of the frequency of the signal. With respect to but a single boundary shadow or image cast upon the total array (the second boundary of the typically variable-area recording being redundant and serving primarily to improve the signal-to-noise ratio and cancel low frequency noise due to film weave and vibration modulation of optical components), each of the 256 elements of a CCD 110/110F used as array 21 will provide an output signal, those sensors in the shadow providing merely "dark" signals of comparatively low amplitude while those illuminated by light from source 25 providing a signal of considerably more amplitude. The boundary or transition between dark and illuminated portions of array 21 may involve several sensor elements because of imperfections in the recording, optical edge effects such as interference fringing, and the like. Hence, even when processed in differential amplifier 34 where the output signal is compared with a compensation signal internally generated in the CCD 110F exemplifying photoelectric device 20, the output signal (as shown in FIG. 5A wherein the amplitude of each sensor signal appears on a time base) will be comparatively ragged and comprise a large plurality of pulses each representing the output of one of the sensors in array 21, and the time position of the transition is indeterminate because of the nature of the discrete sampling technique employed, as well as the edge effects noted above.

Because the essential information in the wave form of FIG. 5A lies at the rise and fall boundaries of the envelope, the output signal from amplifier 34 is filtered in low-pass filter 36 which typically has an upper cut-off frequency of around 1 to 2 MHz and therefore not only suppresses the high frequency of the reset clock transients and the gated individual cell pulses in the waveform of FIG. 5A, but also smooths or averages the envelope to produce the waveform such as that shown in FIG. 5B. Filter 36 acts as an optimally transient Gaussian or Bessell filter to compensate in part for the lens transfer function of imaging optics used to convert the record to electrical signals, and also provides means for interpolating between the signals produced by the photoelectric sensors located at the transition zone. As shown in FIG. 5B, the transition appears as a steep slope between the minimum and maximum signals, but because of the noted edge effects and sampling indeterminacy, the slope may not be sufficiently vertical to establish within a desired degree of resolution, the precise edge or boundary position. In addition, the zero or base level of even the filtered signal from detector 20 tends to vary depending on the total light flux to which detector 20 is exposed, thus contributing further to the difficulty of determining within a desired resolution the precise location of the boundary of the optically recorded signal.

Hence, the output signal from filter 36 is wave-shaped to provide determination of the boundary position with a resolution exceeding even the half-spacing between the sensor elements of the array. This end is accomplished in part by filter 36 and in part by the circuit particularly shown in FIG. 4 wherein the input signal is fed into a bilateral DC restoring circuit formed of a pair of back-to-back clamps, each exemplified by one of diodes 43 and 44 and its associated RC tank circuit. Typically, for an input signal of about 4 to 5 volts peak-to-peak both capacitors 45 and 47 are 0.01µf capacitors, but resistor 46 and 48 are respectively typically 2KΩ and 1KΩ so that the respective clamp circuits clamp at different voltages. The RC time constant of the tank circuits is much greater than the signal period or total scan cycle. Hence, the effect of the bilateral DC restorer circuit of FIG. 4 (typically for an input which swings over 1 V peak-to-peak) is to provide a zero or base signal level centered at some value set by the ratio of resistors 46 and 48, i.e. at approximately 30 to 50% above the nominal zero or base level of the original incoming signal, because although the peak values of the original signal may vary, the base level is established at the same relative position between the average peak values. The DC level restorer output signal, such as is shown for example in FIG. 5C, is applied to axis-crossing detector 52, so that as well known in the art, the latter will provide a signal with an abrupt transition when the level of the input signal crosses through the base level established by the bilateral DC restorer output signal. All such transitions of the output signal from filter 36 in one direction through the base level established by the bilateral DC restoring circuit occur at a point in time representative of the exact boundary position, relative to a reference or zero time. The latter is established by an abrupt change in the signal through the DC restoring circuit caused by opening of field effect transistor 49 responsively to the reset signal from frequency divider 33 occuring at the end of a scan across the array 22 and applied to the gate of transistor 49. During the reset time interval following the pulse from divider 33, one thus ignores the noise and recovery transients occuring at the output of the detector. The amplitude of the output of the axis-crossing detector is, of course, a fixed value, so that essentially the waveform (as for example is shown in FIG. 5D) of the output signal from axis-crossing detector 52 and therefore from wave-shaping circuit 38 is a rectangular wave of substantially fixed amplitude, the pulse-width of the waveform being a function of the position, at a predetermined time, of the boundary of the optically recorded signal.

The sampling or scanning rate at which the individual sensors of array 22 are sampled is typically about 12 MHz so that the signals from shaper 38 are presented to converter 34 at a frequency or repetition rate approximately in the range of 30 to 50 KHz. The width of each of the pulses at the output of wave-shaper 38 can then readily be converted to amplitude signals in a pulse-width-to-voltage converter 52 which is well known. The output of converter 54 typically is that shown in FIG. 5E, keeping in mind that the time scale of the waveform of FIG. 5E is several hundred times greater than that of the waveform shown for example in FIG. 5A, and the amplitude of each pulse in FIG. 4E is proportional to the position of the transition in an entire wave train of FIG. 5A. The output from converter 54 is again filtered in filter 56 in order to suppress the sampling frequency and obtain the envelope as the desired audio signal (as is shown for example in FIG. 5F) which when fed to loudspeaker system 58 will be an accurate reproduction of the optically recorded audio signal with a substantially reduced noise content.

It will be appreciated that because only one variable boundary need be recorded for reproduction according to the present system, the present invention lends itself very readily to recording of multiple sound tracks within the same or little more space than is presently required for variable-area sound track recording. For example, one can record a sound track comprising two approximately parallel transparent strips so as to provide four different strip edge or boundaries, each of which encodes a respective sound track. Such four channel recording can readily be decoded and reproduced according to the principles of the present invention by a modification which employs a structure quite similar to that disclosed in FIGS. 1-3 inclusive. Particularly, the four channel variation of the device of the present invention employs all of the elements of FIG. 3 except converter 54, and also includes an additional low-pass filter 56 and speaker system 58 for each of the additional channels. In place of pulse-to-voltage converter 54 of FIG. 3, as shown in FIG. 6, the four channel version of the present invention employs scanning logic 68 for providing a weave-insensitive separation of the four transitions obtained during each scanning cycle of device 20, and switching circuitry 69 for directing the separate signals into their respective channels.

Consequently, scanning logic 68 as shown in FIG. 6 includes input terminal 70 at which the output signal of wave-shaper 38 is intended to be applied. Terminal 70 is coupled to the input of a quadrature detector including respective inputs of AND gate 72 and NAND gate 74, and the input to signal inverter 76. The output of inverter 76 is connected to respective inputs of NAND gate 78 and AND gate 80. The scanning logic also includes a divide-by-two circuit such as JK flip flop 82, the output of which is connected to the other inputs respectively to NAND gate 74 and AND gate 80, and also is connected as an input to inverter 84. The output of inverter 84 is connected as the other inputs to NAND gate 78 and AND gate 72.

The outputs of AND gates 72 and 80 are respectively connected through resistors 86 and 87 to the input (formed by the base of npn transistor 88) of a first switched amplifying means. The latter also includes npn switching transistor 90, the collector of which is connected to the base of transistor 88 and the emitter of which is connected in common with the emitter of transistor 88 to ground. Similarly, the outputs of gates 74 and 78 are respectively connected through resistors 91 and 92 to the input, (exemplified by the base of pnp transistor 94) of a second switched amplifying means. The latter includes switching transistor 96 having its collector coupled to the base of transistor 94 and its emitter coupled in common with the emitter of transistor 94 to terminal 97 at which a bias voltage is intended to be applied. The collectors of transistors 88 and 94 are connected to one another through series-coupled identical resistors 98 and 99. The junction of resistors 98 and 99 is connected to an integrating filter formed typically of series resistor 100, the input and output of the latter being respectively connected to ground through capacitor 102 and resistor 104. The junction of resistor 104 and resistor 100 are connected to the input of amplifier 106. It is preferred that the time constant of the filter formed of components 100, 102 and 104 be comparatively long, and typically then capacitor 102 is a 1μf, resistors 100 and 104 are respectively 2.2MΩ and 47KΩ, resistors 98 and 99 being then typically 10KΩ each.

The output of amplifier 106 is connected to the control input terminal of a variable delay generator such as a voltage-controlled monostable multivibrator or one-shot 108. Typically the latter is a CMOS microchip such as Fairchild's 4528. The trigger input to one-shot 108 is connected to terminal 110 at which the frame synchronism or reset signal provided by the CCD 110/110F type of device 20 is intended to be applied. The output of one-shot 108 is connected to the start or trigger input of a clock such as astable multivibrator 112. The latter typically can be a CMOS circuit such as the CD4047A chip available from RCA. The output from multivibrator 112 is coupled as the trigger input to flip-flop 82 and also as the count input to counter 114. Because the counter is intended to provide a count from 0 to 5, only six output lines are therefore required, and counter 114 can readily be formed as part of a decade counter such as the CMOS chip identified as 4017 available from either Harris or RCA. Terminal 110 is also connected to the reset input terminal of flip-flop 82 and to the reset input terminal of counter 114. Zero count output line 115 from counter 114 is connected as an input to NOR gate 116. Fourth count output line 117 from counter 114 is connected to the reset input terminal of multivibrator 112 and also to another input terminal of NOR gate 116. The output of gate 116 is connected through resistor 118 to the base of transistor 96, and is also connected as an input to inverter 119. The output of inverter 119 is connected through resistor 120 to the base of transistor 90.

Circuit 68 as thus described in FIG. 6 constitutes the logic to be employed for scanning and centering the output signals from wave-shaper 38 when the system of the invention is used in connection with a quadraphonic or dual bilateral optical record.

It will be recognized that gates 72, 74, 78 and 80 constitute a quadrature detector which gates the clock output, (preferably a square wave provided by the triggering of flip-flop 82 by the output of astable multivibrator 112) with the input waveform. There are four boundary positions read during each scan of the image of a dual bilateral recording, two providing an electrical signal transition in one direction and two providing signal transitions in the opposite direction. Thus, because the scan rate of device 20 is substantially constant, in such case the output of amplifier 34 will be a pair of rectangular waves as shown in FIG. 7A with a repetition rate twice the scan rate of device 20. It is preferred that the repetition rate of the square wave output from flip-flop 82 be at a similar frequency so as to provide pulses which can have leading and trailing edges respectively 90° out of phase with the corresponding leading and trailing edges of the pulses in the output from wave-shaper 38, as shown in FIG. 7B. Thus, pulses from flip-flop 82, when gated with pulses from wave-shaper 38 at terminal 70, will provide during each scan cycle a pair of wave trains which when combined at the junction of resistors 98 and 99 yield a waveform such as that shown in FIG. 7C. The integration of the latter waveform by capacitor 102 during a scan cycle provides a DC signal, the magnitude of which is proportional to the time displacement or phase relationship of the pulse from shaper 38 with respect to the corresponding internally generated pulses from flip-flop 82. When the phase relation is exactly 90°, the total integrated voltage is zero, and the magnitude and the polarity of the integrated voltage varies according respectively to the extent and the direction in which that phase relation differs from 90°.

One-shot 108 is turned on by a frame synchronising pulse or reset signal (FIG. 7D) applied at terminal 110 from device 20, typically at the beginning or end of a scanning cycle. Because the voltage provided by capacitor 102 as amplified by amplifier 106 is applied to the control terminal of one-shot 108, the duration of the monostable pulse provided by the one-shot is a function of the phase relationship developed in the quadrature detector between the signal pulses and the internally generated pulses. Thus, one-shot 108 produces a delay pulse (FIG. 7E) the trailing edge of which serves to trigger the operation of clock 112. For a zero input control voltage, the delay time provided by the pulse output of one-shot 108 starts clock 112 relative to whatever normal delay is to be expected (considering propagation delays and the time required for operation of flip-flop 82) to be sufficient so that the pulses generated by flip-flop 82 are 90° out of phase with the input signal pulses. Changes in the voltage at the control input terminal of one-shot 108 will serve to cause the pulses from flip-flop 82 to either lag or lead the input pulses from shaper 38.

A filmstrip moving through an optical reading head can be expected to exhibit some lateral motion or weave of typically of two and as much as ten mils. Boundary position variations due to weave would tend to appear particularly as low frequency sound (usually in the 20–60 Hz range) in the present invention in the absence of some system for suppressing or ignoring the weave effect. Scanning logic 68 thus described, is intended to provide automatic "centering" in that when weaving occurs, it immediately becomes apparent as a phase shift identically affecting all of the signals in each scan with respect to the pulses internally generated by flip-flop 82. Consequently, the phase shift due to weave provides an error signal exemplified by the integrated signal provided by capacitor 102, and the scanning logic immediately servos or adjusts itself by changing the timing of pulses from flip-flop 82 so as to restore the 90° phase relationship between the input signal from wave-shaper 38 and the output of flip-flop 82.

Counter 114 is triggered or enabled to count by the same sychronising pulse at terminal 110 as triggers one-shot 108. During each scan, the clock pulses from a stable multivibrator 112 (which are at twice the repetition rate of the pulse from flip-flop 82) are counted in counter 114. The zeroth count recorded in counter 114 is applied on line 115 as one input to gate 116. The fifth count in counter 114 is applied on line 117 as another input to gate 116 and also to reset or stop terminal of multivibrator 112.

The first through fourth counts recorded in counter 114 are respectively applied as inputs on lines 118, 119, 120 and 121 to switching circuitry 69, and specifically as respective inputs to AND gates 122, 124, 126 and 128. Output lines 118, 119, 120 and 121 are also connected as inputs to the control terminals of first quad bilateral switch 130 such as a CD4066 CMOS chip available from National Semiconductor.

The output of multivibrator 112 is also connected as an input to monostable multivibrator or one-shot 132 which is intended to provide an output pulse of approximately 0.5 to 1 sec, and can be exemplified by the retriggerable multistable multivibrator available as a CMOS chip sold under the designation 4528 by a number of manufacturers. The output of one-shot 132 is connected as the respective other input to gates 122, 124, 126 and 128. The outputs of the latter gates are respectively connected to corresponding and control input terminals of a second quad bilateral switch 134.

Terminal 170 is connected to the control or switching input of switched current source 136, the output of the latter being connected to all of the input switching terminals of switch 130. The output terminals of the latter in turn are respectively connected to corresponding input terminals of switch 134. In turn, the switching outputs of the latter are connected to a current sink, typically ground or the like.

Switching circuit 69 also includes series capacitor 142 and 143 connected between ground and the input of low band pass filter 144. The output of filter 144 in turn is coupled to the input of amplifier 146, and the output of the latter is in turn connected as the input to loudspeaker system 148. Filter 144 preferably has an upper cut-off frequency in the vicinity of 20 KHz. Similarly, series connected resistors 150 and 151 are also connected between ground and the input of a similar low pass filter 152. The output of the latter is connected through amplifier 154 to the input of loudspeaker system 156. In like manner series connected capacitors 158 and 159 are connected between ground and the input of a third low pass filter 160, the output of the latter being connected through amplifier 162 to the input of loudspeaker system 164. Lastly series coupled capacitors 166 and 167 are connected between ground and yet another low pass filter 168. The output of the latter is connected through amplifier 170 to the input of loudspeaker system 172.

First output line 174 of quad switch 130 (line 174 being connectable by switch 130 to line 118 and by switch 134 to the output of gate 122) is connected to the junction of capacitor 142 and 143. Second output line 176, third output line 178 and fourth output line 180 from quad switch 130 (which are respectively connectable by the latter to line 119, 120 and 121 and by switch 134 to the output of gates 124, 126 and 128) are respectively connected to the corresponding junctions between capacitors 150 and 151, capacitors 158 and 159, and capacitors 166 and 167.

In operation of switching circuit 69, it will be appreciated that the outputs from counter 114 during each scan cycle of device 20 provides a signal corresponding in time, and approximately 90° out of phase, with a corresponding signal transition appearing in the output of shaper 38 and such counter outputs are applied to sequentially operate the switches in quad switch 130. The input to quad switch 130, which triggers or switches current source 136 on, is the output signal from shaper 38. Hence, switch 130 operates to couple output line 174 to the output of amplifier 136 during the time interval when the first transition in a scan appears. Similarly, output line 176, 178 and 180 are coupled by quad switch 130 to the output of amplifier 136 at the respective times during which the second, third and fourth transitions appear in the output of shaper 38. Because output lines 174, 176, 178 and 180 are respectively coupled to individual channels, each containing a low pass filter to obtain the envelope of the pulse trains directed to the respective channel, and a loudspeaker system for providing sound signals corresponding to the filtered envelope of the pulse trains fed to the respective channels, it will be apparent that switch 130 essentially serves to demultiplex the signal transitions in each scan.

The same count states which are applied to switch 130 are also applied to gates 122, 124, 126 and 128 which, however, are enabled by the output of one-shot 132. Hence these gates operate quad switch 134 in sequence to cause charge built up on the capacitors coupled to line 172, 174, 176, 178 and 180 to be dumped, freeing the capacitors to be charged by the signal occuring during the next scan.

Since certain changes may be made in the above apparatus without departing from the scope of the invention herein involved, it is intended that all matter contained in the above description or shown in the accompanying drawings shall be interpreted in an illustrative and not in a limiting sense. For instance, boundary detection can be achieved by a number of different techniques provided that the major aspect of the recovered signal is indicative of boundary location and is not derived from the other aspects of the film track. The system hereinbefore explicitly described employs digital techniques; one can also use analog techniques instead and vice-versa. Typically, the analog filters employed can be digital filters for example. Additionally, although the boundary detection herein described has employed serial scanning of an array of detectors, it will be appreciated that such an array can be read in parallel and the outputs processed, as by computer, to recover the essential boundary information.

What is claimed is:

1. A system for reproducing sound from audio signals optically recorded such that the audio information is embodied in variations of the positions of a boundary on the optical record, said system comprising:

means for detecting the position of said boundary and for providing a sequence of electrical signal transitions, the phase of each of which is representative of correspondingly successive variations in said position of said boundary, and means for converting said sequence of signal transition into sound.

2. A system as defined in claim 1 wherein said means for detecting comprises photoelectric means, means for imaging said boundary onto said photoelectric means such that said variations in the position of said boundary on said record provide corresponding changes in the position of the image of said boundary on said photoelectric means, and means for producing sequential electrical output signals from said photoelectric means, each of which electrical output signals contains at least a corresponding one of said electrical transition signals.

3. A system as defined in claim 2 including first means for filtering said electrical output signals so as to produce signals each of which is substantially the envelope of a corresponding one of said electrical output signals.

4. A system as defined in claim 1 wherein said means for detecting comprises a substantially linear array of discrete photoelectric elements and means for imaging said boundary onto said array such that said variations in the position of said boundary on said record provide corresponding changes in the position of the image of said boundary on said array.

5. A system as defined in claim 4 including scanning means for cyclically sampling said array for producing sequential pulse trains, each of which contains at least a corresponding one of said electrical transition signals as a transition between a group of relatively low amplitude pulses and a group of relatively high amplitude pulses.

6. A system as defined in claim 1 wherein said means for detecting comprises a photoelectric element and means for moving a light spot across said record substantially transversely to the average direction of said boundary, said element and means for moving being disposed so that said boundary can interrupt the illumination of said element by said light spot.

7. A system as defined in claim 5 including first means for filtering said pulse trains so as to produce signals each of which is substantially the envelope of a corresponding one of said pulse trains.

8. A system as defined in claim 7 wherein said first means for filtering is a filter having a pass-band with an upper cutoff frequency below the rate at which said scanning means samples the elements of said array.

9. A system as defined in claim 3 including means for wave-shaping said envelope.

10. A system as defined in claim 9 wherein said means for wave-shaping includes a bilateral DC level restorer having its input coupled to the output of said first means for filtering, and an axis-crossing detector having its input coupled to the output of said level restorer for producing substantially rectangular pulses, the duration of each of which is in proportion to the phase of a corresponding one of said electrical output signals.

11. A system as defined in claim 10 wherein said means for converting said signal to sound comprises means for converting the duration of pulses produced by said axis-crossing detector into the amplitude of corresponding pulses.

12. A system as defined in claim 9 wherein said means for converting said signal to sound comprises pulse-width-to-amplitude converter means coupled to the output of said means for wave-shaping, second means for filtering the envelope of the output signal from said means for converting, and loudspeaker means coupled to the output of said second filtering means.

13. A system for reproducing sound from audio signals optically recorded as a plurality of different sound tracks on a common optical record movable along said track through a reading head, the audio information in each track being embodied in variations of the positions of a boundary of said each track, said system comprising in combination;

means for cyclically scanning said track during motion thereof through said head so as to detect the position of each of said boundaries during the scan cycle and for providing for each such scan cycle a sequence of electrical signal transitions, the phase of each of which is representative of correspondingly successive variations in the position of each of said boundaries;

a plurality of separate transmission channels each corresponding to the ordinal value of a respective one of said signal transitions in said sequence;

means for converting the phase of each said signal transition to the amplitude of a corresponding drive signal; and means for separating the drive signals in each said sequence and for directing the separated drive signals into corresponding ones of said transmission channels.

14. A system as defined in claim 13 wherein said means for scanning comprises a substantially linear array of discrete photosensitive elements;

means for imaging all of said boundaries onto said array such that said variations in the position of each of said boundaries on said record provide corresponding changes in the position of the image of said boundary on said array;

scanning means for cyclically sampling said array for producing sequential pulse trains, each of which contains a plurality of electrical transition signals corresponding respectively in the time domain to the position of the image of each of said boundaries on said array during each sampling cycle; and means for filtering said pulse trains so as to produce signals each of which contains said plurality of electrical transition signals and is substantially the envelope of a corresponding one of said pulse trains.

15. A system as defined in claim 13 wherein said means for separating includes logic means for suppressing changes in the phase of said signal transitions due to motion of said track transverse to the direction of motion thereof along said track through said reading head.

16. Method of reproducing sound from audio signals optically recorded such that the audio information is embodied in variations of the positions of a boundary on the optical record, said method comprising the steps of:

periodically detecting said boundary so as to provide a sequence of signals each containing at least one corresponding electrical signal transition, the phase of each of which transitions is representative of correspondingly successive variations in the position of said boundary, and converting said sequence of signals into sound.

17. Method as defined in claim 16 including the steps of filtering said sequence of signals so as to produce output signals each of which is substantially the envelope of a corresponding one of said electrical signals in said sequence.

* * * * *